United States Patent [19]

Martinez, Jr. et al.

[11] Patent Number: 5,596,731
[45] Date of Patent: Jan. 21, 1997

[54] SINGLE CLOCK BUS TRANSFERS DURING BURST AND NON-BURST CYCLES

[75] Inventors: Marvin W. Martinez, Jr.; Mark W. Bluhm, both of Plano, Tex.

[73] Assignee: Cyrix Corporation, Richardson, Tex.

[21] Appl. No.: 426,300

[22] Filed: Apr. 21, 1995

[51] Int. Cl.$^6$ .................................................. G06F 13/38
[52] U.S. Cl. ........................ 395/309; 395/855; 395/449
[58] Field of Search ............................ 395/855, 550, 395/309, 449

[56] References Cited

U.S. PATENT DOCUMENTS

| | | | |
|---|---|---|---|
| 5,255,378 | 10/1993 | Crawford et al. | 395/855 X |
| 5,454,107 | 9/1995 | Lehman et al. | 395/480 |
| 5,526,513 | 7/1996 | Cerutti | 395/496 |

*Primary Examiner*—Glenn A. Auve
*Attorney, Agent, or Firm*—Andrew S. Viger; John L. Maxin

[57] ABSTRACT

A single block bus transfer (SCBT) protocol is implemented, in an exemplary embodiment, in a computer system that includes an x86 microprocessor, system logic, and an external memory subsystem including L2 cache and system DRAM, intercoupled by a 586 bus architecture. The microprocessor's bus interface unit (BIU) includes SCBT logic that generates internal effective BRDY# and the effective KEN# signals from either (a) L2_HIT from the L2 cache, or (b) BRDY# or KEN# from the system logic. The effective KEN# signal is used for convert a potentially cacheable read into a burst fill cycle. The exemplary L2 cache is able to perform address decode and cache look-up in time to return L2 HIT to the processor during the ADS# clock with sufficient timing margin to permit the processor to complete the bus transfer (either not burst bus cycle, or the first bus transfer of a burst cycle) in that clock and set up for a next bus transfer in the next clock. The BIU uses a forced deadclock mechanism to prevent a single clock bus transfer from being followed in the next clock by a next bus transfer if the result would be consecutive read and write cycles (thereby avoiding device driver contention on the data bus).

18 Claims, 7 Drawing Sheets

SINGLE CLOCK BUS TRANSFERS DURING BURST AND NON-BURST CYCLES

BACKGROUND

1. Technical Field

The invention relates generally to computer systems, and more particularly relates to external bus protocols for transfers between a microprocessor and an external memory.

In an exemplary embodiment, the invention is used in 586 computer system with an external level two cache that supports both burst and non-burst transfers between the 586-class microprocessor and the memory subsystem.

2. Related Art

Microprocessor-based computer systems include a microprocessor, memory subsystem, and system logic, intercoupled by a local (system) bus. The microprocessor includes an internal L1 level one) cache that together with the memory subsystem—system memory (DRAM) and, often, external L2 (level two) cache—form a memory hierarchy.

The system logic includes a memory/bus controller that together with the microprocessor implements a bus protocol for transferring data between the microprocessor and the external memory subsystem. If a CPU access (read or write) misses in the L1 cache, the microprocessor runs an external bus cycle to access the memory subsystem. The external access will be serviced by the L2 cache, or if that access misses, the system DRAM.

Without limiting the scope of the invention, this background information is provided in the context of a specific problem to which the invention has application: in x86 computer systems, improving performance on external accesses to an L2 cache.

A conventional 586 computer system uses 64 bit internal and external data buses able to transfer 8 bytes (two dwords or one qword) at a time. The internal L1 cache uses a 32 byte (4 qword) line size, such that cache line fills (reads) and replacements (writes) require the four 64-bit (qword) transfers between the microprocessor and the memory subsystem (L2 cache or system DRAM).

According to the conventional 586 bus architecture and protocol, external bus cycle transfers between the microprocessor and the memory subsystem occur in either burst or non-burst mode. Burst mode bus cycles transfer in sequence the four 4 qwords of an L1 cache—line fills, replacements, or snoop write-backs in response to cache inquiries during DMA (direct memory access) operations. In addition, some microprocessors support write gathering in which writes to the contiguous bytes of a cache line are gathered in internal write buffers and then written out to the memory subsystem in burst mode. Non-burst mode bus cycles are used to transfer (read/write) 1 to 8 bytes at a time in a single bus transfer.

The microprocessor initiates an external bus cycle with an address strobe ADS# ("#" indicating an active-low signal) accompanied by an address and bus cycle definition signals—conventional bus cycle definition signals include W/R# (write/read), D/C# (data/control, and M/IO# (memory/IO). In addition, the microprocessor will signal CACHE# (cache cycle indicator) if the current bus cycle is, for a read, potentially cacheable, or for a write, a cache line write back or replacement.

The memory subsystem returns BRDY# when the current transfer is complete. For non-burst transfers, a single BRDY# is returned, completing the bus cycle. For burst transfers, each of the four qword transfers is completed by a BRDY#, with the last BRDY# completing the burst cycle.

The 586 bus architecture supports pipelined bus cycles. The bus cycle control signal NA# (next address) is driven by the system during a current bus cycle (before the last BRDY# has been returned) to request that the microprocessor drive out address/control for the next pending bus cycle request, designated a pipeline bus cycle. NA# is ignored if there is no pending bus cycle request, or if either the current or next bus cycle is a line replacement or snoop write-back cycle.

Whether an external bus cycle is a burst or non-burst transfer is determined by the microprocessor CACHE# and W/R# bus cycle definition signals, and the system KEN# (cache enable) signal. If CACHE# is asserted for a read cycle, and the system returns KEN#, then the read is converted to a burst fill cycle. Asserting CACHE# for a write cycle indicates a cache line replacement or snoop write-back (or, possibly, a gathered write).

The system returns KEN# in the same clock as BRDY#, or for pipeline bus cycles, in the same clock as BRDY# or NA# is sampled active (whichever occurs first). Thus, for potentially cacheable reads, the microprocessor will sample KEN# contemporaneously with the first assertion of BRDY# or NA#.

After asserting ADS#, the microprocessor samples BRDY#(and, for reads, KEN# ) in the second clock cycle after driving out ADS#, so that the first transfer takes at least two clock cycles. If the address hits in the L2 cache, the bus transfer will be completed and BRDY# returned in this clock cycle.

In current memory subsystems, L2 caches are able to complete a bus transfer within two clock cycles, while system DRAM typically takes 4 clock cycles to complete the first transfer. For burst transfers, the L2 cache is able to complete the remaining three transfers of the burst in 1 clock cycle each (2-1-1-1), while system DRAM typically takes 2 clock cycles for each of the remaining transfers (4-2-2-2).

Computer system performance could be improved by reducing the number of clock cycles to complete a non-burst cycle, or to complete the first transfer of a burst cycle. In particular, current L2 cache performance is such that, depending on speed of the local bus, the L2 cache would be able to detect ADS#, perform cache look-up, and signal a hit in the same clock cycle as the ADS# strobe.

SUMMARY

An object of the invention is to complete a bus transfer, either a non-burst bus cycle or the first transfer of a burst cycle, in the same clock in which the bus transfer is initiated.

This and other objects of the invention are achieved by a computer system that implements a single clock bus transfer protocol. The computer system includes a processor, system logic, and an external memory subsystem, intercoupled by a bus architecture that uses a bus protocol in which the processor initiates a bus transfer between the processor and the memory subsystem by outputting an ADDRESS, and the system logic signals that the bus transfer is complete by returning READY.

In one aspect of the invention, the computer system includes a bus interface unit (BIU) in the processor that interfaces to the bus architecture and implements the bus protocol including a single clock bus transfer (SCBT) protocol. In response to the BIU initiating a bus transfer in a first clock with an ADDRESS, the memory subsystem generates a transfer ready signal to indicate that it is ready to complete the transfer. The transfer ready signal is provided to both the system logic and the processor—the system logic signals READY to the processor in a subsequent clock.

For at least some bus transfers, the memory subsystem generates the transfer ready signal in the first clock of such bus transfer. SCBT logic generates an effective READY in response to either (a) READY from the system logic, or (b) the transfer ready signal from the memory subsystem. In response to the generation of the effective READY, the BIU completes the bus transfer, such that, for bus transfers in which the memory subsystem generates the transfer ready signal in the first clock of the bus transfer, the SCBT logic generates the effective READY in such first clock, thereby enabling the BIU to complete the bus transfer in the first clock.

In another aspect of the invention, the memory subsystem includes system memory and an L2 cache. The L2 cache is responsive to an ADDRESS hit to generate an L2 HIT signal—this L2 HIT signal is provided to the system logic and the processor as the transfer ready signal.

In another aspect of the invention, the bus protocol includes the burst transfer of a sequence of bus transfers, and for selected bus transfers initiated by the processor, the system logic returns a burst transfer signal substantially simultaneously with the READY to indicate to the BIU that the bus transfer is the first of a burst transfer. The SCBT logic generates an effective burst transfer signal in response to either (a) the burst transfer signal from the system logic, or (b) the L2 HIT signal—in response to the effective burst transfer signal, the BIU detects the bus transfer as the first of a burst transfer.

In another aspect of the invention, if a current bus transfer that is completed in the first clock of such bus transfer, the BIU initiates a next bus transfer in a next clock. The SCBT logic inhibits the BIU from initiating the next bus transfer in the next clock if the next bus transfer would result in a read and a write bus transfer occurring in consecutive clocks.

In an exemplary embodiment, computer system uses an x86microprocessor with an x86 pipelined bus architecture (such as a 586 bus architecture). According to the basic bus protocol signaling, a bus transfer is initiated when the microprocessor drives out the ADS# strobe and an ADDRESS—the system logic returns BRDY# to complete the bus transfer. In the case of a potentially cacheable read, the system logic returns KEN# along with BRDY# to convert the bus transfer into a burst fill cycle. The SCBT logic generates an effective BRDY# EFF_BRDY# and an effective KEN# EFF_KEN# from either (a) BRDY# and KEN#, or (b) the L2 HIT signal.

Embodiments of the invention may be implemented to realize one or more of the following technical advantages. The SCBT protocol allows bus transfers—either noncacheable read/write cycles, or burst fills or replacements/snoop write-backs—to be completed in the same clock as the ADS# strobe that initiates the transfer. Because the system logic may not be able to return BRDY# (or KEN# in the same clock as ADS#, the BIU includes SCBT logic that generates an effective BRDY# (and effective KEN#) using the L2 HIT signal from the L2 cache—the exemplary L2 cache is able to decode the ADDRESS and perform a cache look-up in time to return L2 HIT to the processor during the ADS# clock with sufficient timing margin to permit the processor to complete the bus transfer in that clock and set up for a next bus transfer in the next clock. The SCBT protocol inhibits the processor from initiating a next bus transfer in the next clock after a single clock bus transfer the result would be consecutive read and write transfers.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION

The detailed description of an exemplary embodiment of the single clock bus transfer (SCBT) protocol is organized as follows:

1. Exemplary Processor System
1.1. Microprocessor
1.2. System
2. Single Clock Bus Transfers
2.1. SCBT Signals
2.2. SCBT Protocol
3. Conclusion This organizational outline, and the corresponding headings, are used in this Detailed Description for convenience of reference only.

The exemplary single clock bus transfer protocol is used in a computer system with a 586 bus architecture in which the memory subsystem includes an L2 cache that is able to respond to an address from the microprocessor in the same clock cycle as the address strobe, thereby completing the transfer. Detailed descriptions of conventional or known aspects of microprocessor systems are omitted so as to not obscure the description of the invention. In particular, terminology specific to the x86 microprocessor architecture (such as signal nomenclature, addressing modes, pin-out definition, etc.) is known to practitioners in the microprocessor field, as is the basic design and operation of such microprocessors and of computer systems based on them. In addition, with respect to burst mode transfers, those skilled in the art are familiar with the signaling protocols used on the conventional 586 (Pentium) bus, including addressing, cache control, and burst transfers.

In the context of this Detailed Description, references to a single clock bus transfer (SCBT) and the associated SCBT protocol will mean either a non-burst bus cycle (i.e., a bus transaction with only one bus transfer), or the first bus transfer of a burst (fills or replacements/snoop write-backs) cycle that will take a total of 4 bus transfers to complete.

When used with a signal, the # symbol designates a signal that is active low, while the / symbol designates the complement of a signal.

1.1 Microprocessor

Figure 1A:
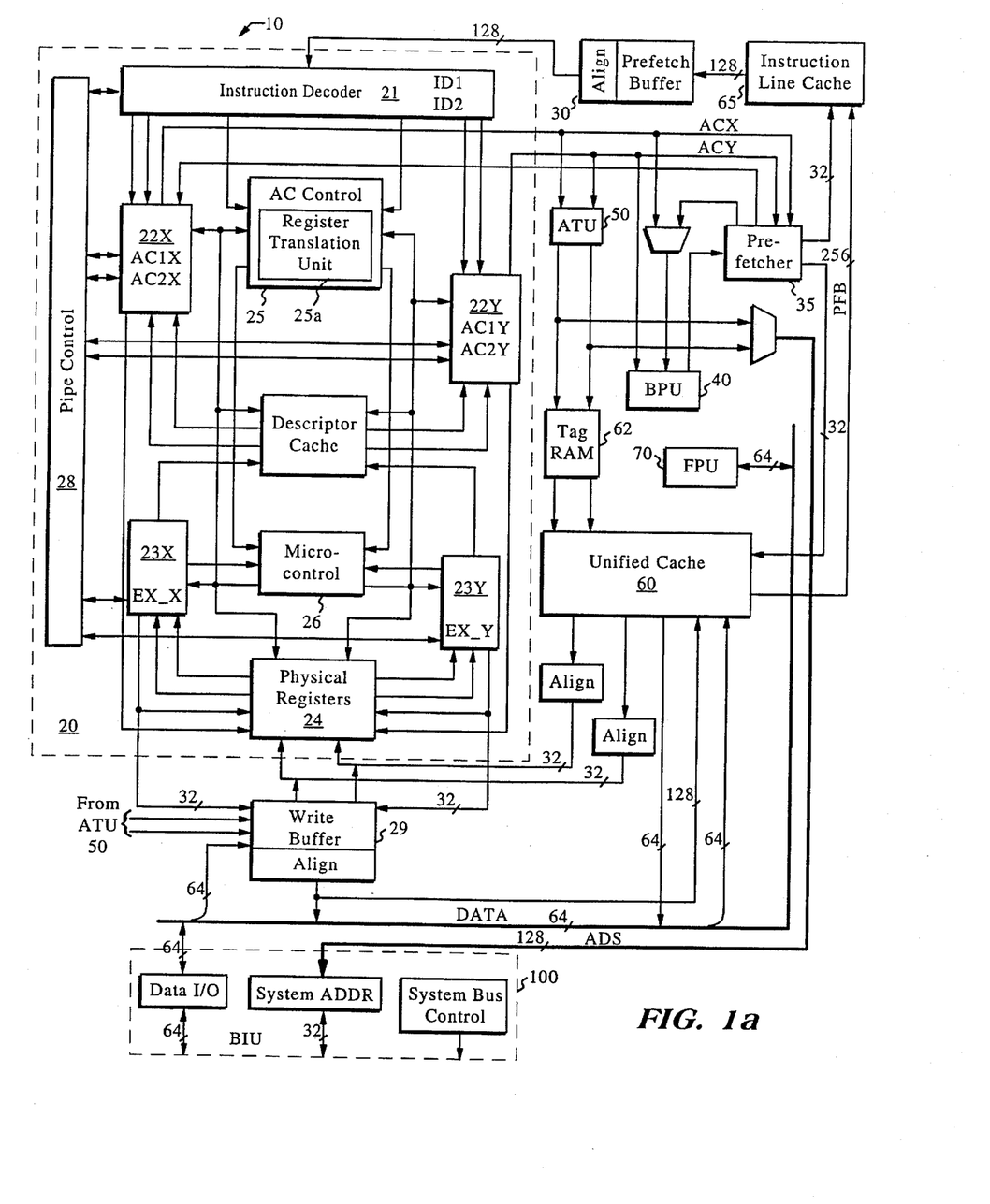
FIG. 1a is a general block diagram of the exemplary microprocessor.

Referring to FIG. 1a, the major sub-blocks of a microprocessor 10 include: (a) CPU core 20, (b) prefetch buffer 30, (c) prefetcher 35, (d) BPU (branch processing unit) 40, (e) ATU (Address Translation Unit) 50, and (f) unified 16 Kbyte code/data cache 60, including TAG RAM 62. A 256 byte instruction line cache 65 provides a primary instruction cache to reduce instruction to the unified cache, which operates as a secondary instruction cache. An onboard floating point unit (FPU) 70 executes floating point instructions issued to it by the CPU core 20.

The microprocessor uses internal 32-bit address and 64-bit data buses ADS and DATA. A 256 bit (32 byte) prefetch bus PFB, corresponding to the 32 byte line size of the unified cache 60 and the instruction line cache 65, allows a full line of 32 instruction bytes to be transferred to the instruction line cache in a single clock. Interface to external 32 bit address and 64 bit data buses is through a bus interface unit BIU.

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microrom, provides execution control.

Writes from CPU core 20 are queued into twelve 32 bit write buffers 29—write buffer allocation is performed by the AC control unit 25. These write buffers provide an interface for writes to the unified cache—noncacheable writes go directly from the write buffers to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause exceptions. For each stage, the pipe control unit keeps track of which execution pipe contains the earliest instruction, and provides a stall output and receives a delay input.

BPU 40 predicts the direction of branches (taken or not taken), and provides target addresses for predicted taken branches and unconditional change of flow instructions (jumps, calls, returns). In addition, it monitors speculative execution in the case of branches and floating point instructions, i.e., the execution of instructions speculatively issued after branches which may be resolved as mispredicted, and floating point instructions issued to the FPU which may fault after the speculatively issued instructions have completed execution. If a floating point instruction faults, or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the processor state at each pipe stage as a floating point or predicted branch instruction enters that stage. For these check-pointed instructions, all resources (programmer visible registers, instruction pointer, condition code register) that can be modified by succeeding speculatively issued instructions are check-pointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or the floating point instruction does not fault).

The unified cache 60 is 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (i.e., a write buffer is allocated for each floating point store operation).

Figure 1B:
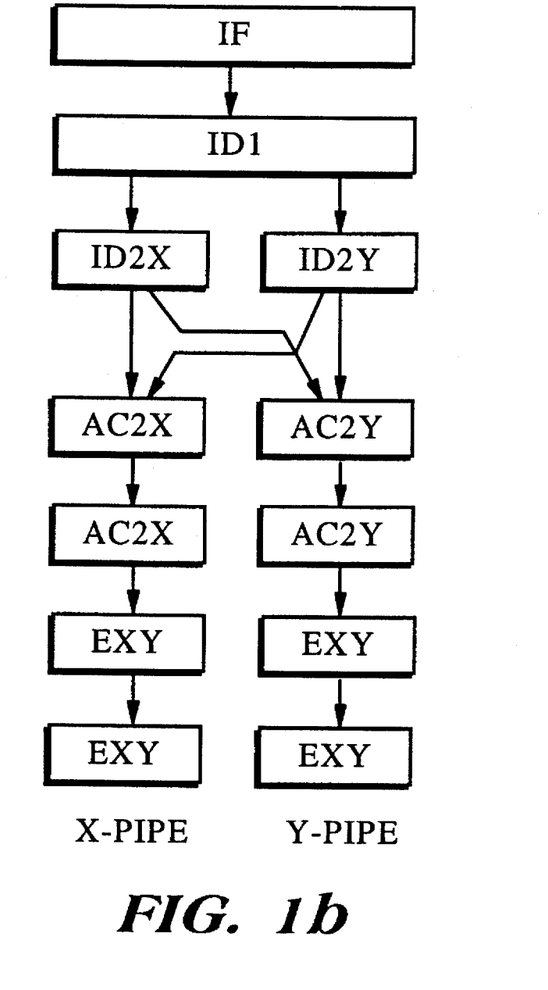
FIG. 1b illustrates the stages of an instruction pipeline.

Referring to FIG. 1b, the microprocessor has seven-stage X and Y execution pipelines: instruction fetch IF, two instruction decode stages ID1 and ID2, two address calculation stages AC1 and AC2, execution EX and write-back WB. Note that the complex instruction decode ID and address calculation AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are identified, such as changes of flow, and immediate and/or displacement operands are separated. The ID2 stage completes decoding the X and Y instructions, generating entry points for the microrom and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA (PUSH all/POP all), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit 25a (including register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes 8 architectural (logical registers (representing the X86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, source operands are obtained by accessing the register file 26 and the unified cache 60 with the physical address (for cache hits, cache access time for the dual ported unified cache is the same as that of a register, effectively extending the register set)—the physical address is either the linear address, or if address translation is enabled, a translated address generated by the ATU 50.

Translated addresses are generated by the ATU 50 (using a TLB or translation lookaside buffer) from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the ATU (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order (i.e., maintaining precise exceptions) is ensured.

The execution stages EXX and EXY perform the operations defined by the instruction. Instructions spend a variable number of clocks in EK i.e., they are allowed to execute out of order (out of order completion). Both EX stages include adder, logical, and shifter functional units, and in addition, the EXX stage contains multiply/divide hardware.

The write back stage WB updates the register file 24, condition codes, and other parts of the machine state with the results of the previously executed instruction. The register file is written in PH1 (phase 1) of WB, and read in PH2 (phase 2) of AC2.

1.2. System

Figure 2:
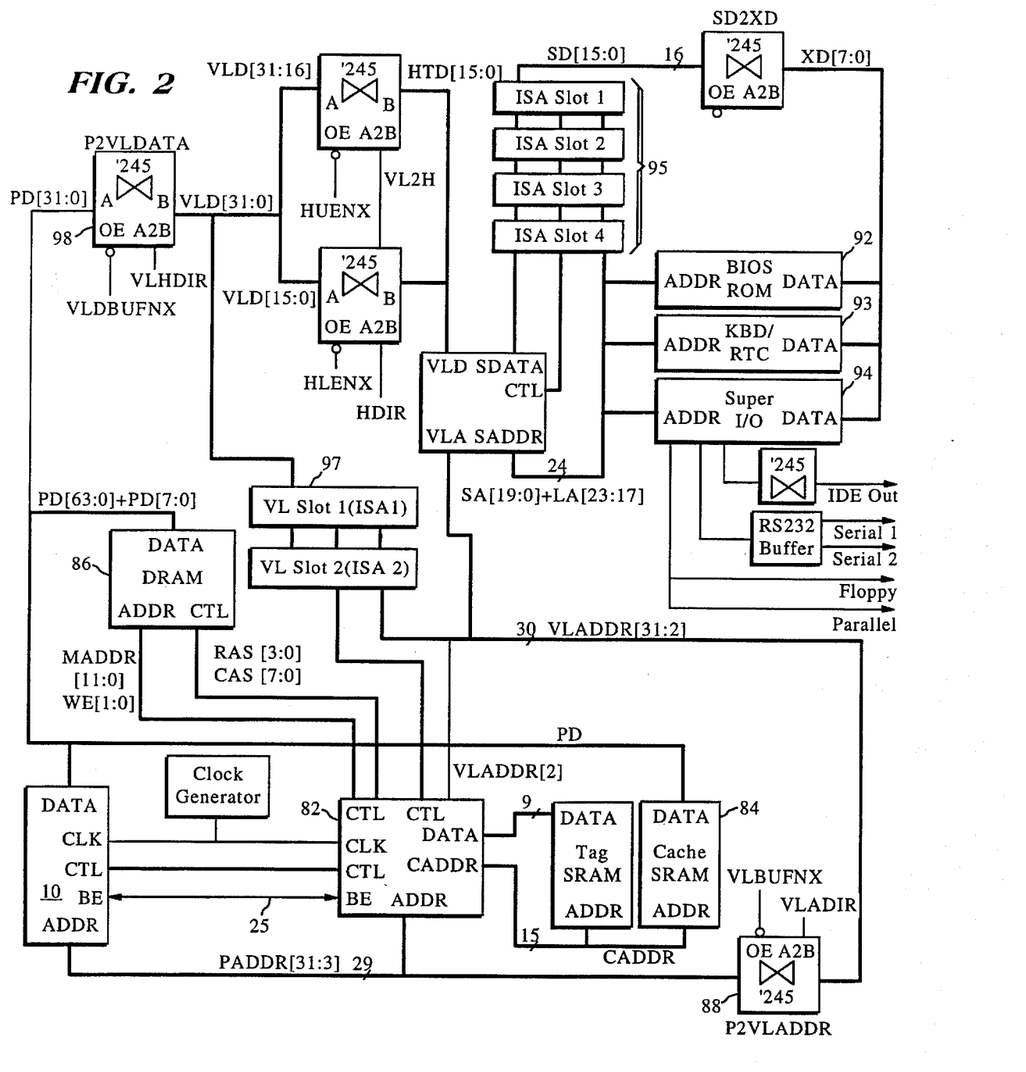
FIG. 2 illustrates an exemplary computer system including a microprocessor, a memory/bus controller, and a memory subsystem including L2 cache and system DRAM.

Referring to FIG. 2, for the exemplary embodiment, microprocessor 10 is used in a processor system that includes a single chip memory and bus controller 82. The memory/bus controller 82 provides the interface between the microprocessor and the external memory subsystem—level two cache 84 and main memory (DRAM) 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bidirectional isolation buffer 88 provides an address interface between microprocessor 80 and VL and ISA buses.

Controller 82 provides control for the VL and ISA bus interface. A VLASA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bidirectional 32/16 multiplexer 96 formed by dual high/low word [31:16]/[15:0] isolation buffers. The VL bus interfaces to standard VL slots 97, and through a bidirectional isolation buffer 98 to the low double word [31:0] of the 64 bit processor data bus PD.

2. Single Clock Bus Transfers

In accordance with the exemplary single clock bus transfer 5CBT) protocol, non-burst bus cycles and the first transfer of a burst cycle are completed in the same clock as ADS# if the address hits in the L2 cache (and a forced deadclock is not required).

Figure 3A:
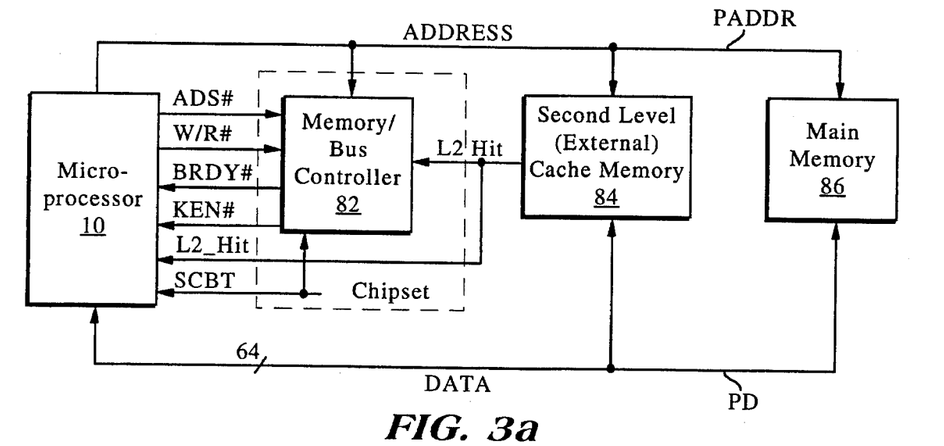
FIG. 3a is a simplified block diagram of the exemplary computer system coupled to implement an exemplary single clock bus transfers (SCBT) protocol according to the invention.

FIG. 3a is a simplified illustration of the exemplary computer system, configured to implement the single clock bus transfer protocol according to the invention. The computer system includes (a) the microprocessor 10, (b) system (chipset) logic including the memory/bus controller 82, and (c) the memory subsystem formed by the L2 cache 84 and system DRAM 86. The exemplary memory/bus controller includes the L2 cache controller.

Address and Data buses PADDR and PD form a local (system) bus that couples the microprocessor to the memory subsystem. The exemplary local bus PD/PADDR is clocked at 33 Mhz.

The microprocessor 10 initiates an external bus cycle by driving out ADS#, and outputting a valid address onto the PADDR address lines. The address is presented both to the L2 cache 84 and the DRAM 86.

From the Background, for a conventional bus protocol, whether the bus cycle is a burst or non-burst transfer is determined by the microprocessor CACHE# and W/R# bus cycle definition signals, and the system KEN# signal. If CACHE# is asserted for a read cycle, and the system returns KEN#, then the read is converted to a burst fill cycle. Asserting CACHE# for a write cycle indicates a cache line replacement or snoop write-back (or, possibly, a gathered write), and the system will expect a burst write cycle.

The exemplary SCBT protocol implements burst signaling differently to accommodate timing constraints on the generation of KEN# by the system logic (see, Section 2.1). In particular, for single clock bus transfers, the system logic may not be able to decode the address and return KEN# (along with BRDY#) during the same clock as ADS#, or at least not with sufficient timing margin to enable the microprocessor to recognize in that clock that the bus transfer is the first of a burst.

The L2 cache signals a hit or miss by outputting a signal designated (for the exemplary embodiment) L2_HIT. For L2 cache hits, the L2 cache asserts L2_HIT when cache look-up and address compare are complete, and the L2 cache is ready to read or write data.

In accordance with the exemplary SCBT protocol, L2_HIT is supplied to both the microprocessor 10 and the memory/bus controller 82. For L2 cache hits, signaling L2_HIT directly to the microprocessor eliminates having to take into account the L2_HIT-to-BRDY# timing delay in the memory/bus controller when implementing single clock bus transfers according to the SCBT protocol.

For L2 cache misses, where the transfer must be serviced by the DRAM, the computer system operates conventionally—the memory/bus controller generates BRDY# in response to L2_HIT (inactive) and internal wait state timer logic. Specifically, after the ADS# strobe, if L2_HIT is not asserted, the memory/bus controller generates BRDY# after a predetermined number of wait states depending on the DRAM access time and local bus timing.

This Detailed Description assumes that a bus transfer (burst or non-burst) hits in the L2 cache unless an L2 cache miss is specified.

2.1. SCBT Signals

The SCBT protocol is implemented with (a) SCBT control signals, and (b) an SCBT configuration signal. For the exemplary SCBT protocol, the SCBT control signals (all generated internally by the microprocessor) are: EFF_BRDY#, EFF_KEN#, CACHE_REQ, and LAST_BRDY#. EFF_BRDY# is generated either from L2_HIT or BRDY#—for L2 cache hits, EFF_BRDY# substitutes for BRDY# in indicating the completion of a bus transfer. Similarly, EFF_KEN# is generated either from L2_HIT or KEN#—for L2 cache hits, EFF_KEN# substitutes for KEN# in indicating that a potentially cacheable read is cacheable and should be converted to a burst fill cycle. CACHE_REQ and LAST_BRDY# are internal control signals.

Referring to FIG. 3a, microprocessor 10 initiates an external bus transfer (burst or non-burst bus cycle) conventionally by outputting an ADS# strobe and driving out bus cycle control signals including W/R# and CACHE#.

Figure 3B:
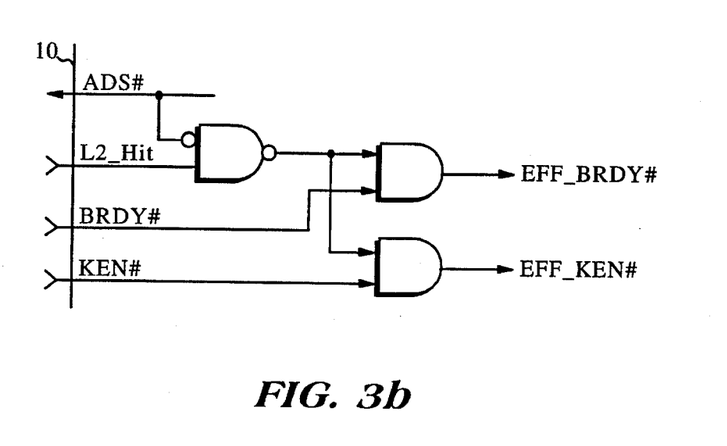
FIG. 3b illustrates exemplary SCBT logic for generating a effective BRDY# signal EFF_BRDY# and an effective KEN# signal EFF_KEN# using the L2_HIT signal from the L2 cache.

FIG. 3b illustrates exemplary SCBT logic that enables the microprocessor to generate internally the effective BRDY# signal EFF_BRDY#, and the effective KEN# signal EFF_KEN#. Specifically, EFF_BRDY# is generated if the microprocessor receives either (a) L2_HIT from the L2 cache when ADS# is asserted, or (b) BRDY# from the memory/bus controller. EFF_KEN# is generated if the microprocessor receives either (a) L2_HIT from the L2 cache when ADS# is asserted, or (b) KEN# from the memory/bus controller.

Thus, if the microprocessor initiates a bus cycle that hits in the L2 cache, L2_HIT will be returned before BRDY# or KEN#, and the microprocessor will generate EFF_BRDY# and EFF_KEN# when L2_HIT is asserted (ADS# active). If the transfer misses in the L2 cache, L2_HIT will not be asserted, and the bus transfer will be serviced by the DRAM—the transfer will complete when the memory/bus controller signals BRDY# causing the microprocessor to generate EFF_BRDY#—for potentially cacheable reads, the microprocessor will contemporaneously with EFF_BRDY# sample EFF_KEN# to determine if the bus cycle should be converted into a fill cycle.

To complete a bus transfer in the same clock as the ADS# strobe in accordance with the SCBT protocol, the L2_HIT signal can be generated either (a) asynchronously, or (b) synchronously on the falling edge of the system clock. For the exemplary embodiment, the L2_HIT signal is generated asynchronously to alleviate timing constraints (i.e., avoiding the design constraint that the L2 cache signal L2_HIT by the first falling edge of the system clock), and because current computer system designs commonly use the rising edge of the system clock for timing, such that the falling edge specification is not precise enough to be used for synchronization.

For a given local bus speed, computer system design to support the SCBT protocol depends on bus timing specifications for the microprocessor and L2 cache. These specifications must be selected to allow the microprocessor to complete the current bus transfer, and set up for the next bus operation in the next clock cycle.

For the 33 Mhz system bus of the exemplary embodiment, each clock period is 30 nanoseconds. The microprocessor requires a clock-to-out time for ADS# to become valid, and a data set up time for the microprocessor to output or accept valid dam after L2_HIT is asserted and EFF_BRDY# is generated. The L2 cache requires an ADS#-to-L2_HIT time for L2_HIT to be generated after ADS# becomes valid and the associated L2 cache lookup is completed.

The exemplary microprocessor is designed for a 6 nanosecond clock-to-out time for ADS#, and a 5 nanosecond data set up time for EFF_BRDY# to be valid (and the microprocessor to output or receive data). Thus, of the 30 nanosecond clock period, the microprocessor requires 11 nanoseconds, leaving 19 nanoseconds for the L2 cache to generate L2_HIT in response to an ADS# strobe.

The exemplary L2 cache 84 is an asynchronous 2-1-1-1 SRAM (static RAM) with an ADS#-to-L2_HIT timing specification of less than 19 nanoseconds. In accordance with the SCBT protocol, this ADS#-to-L2_HIT timing specification permits the exemplary microprocessor to complete a bus transfer in a single clock (rather than 2).

Alternatively, if the L2_HIT signal is not supplied directly to the microprocessor, then the performance requirement for the L2 cache is increased to take into account the L2_HIT-to-BRDY# time of the memory/bus controller (assuming that microprocessor design specifications are not changed and the system bus timing is not reduced). Typical BRDY# generation times are 5 nanoseconds—other specifications being equal, the ADS#-to-L2_HIT time for the L2 cache would have to reduce to 14 nanoseconds.

Referring to FIG. 3a, for the exemplary embodiment, the microprocessor 10 includes an SCBT configuration signal input from the chipset. The SCBT configuration signal is used to maintain compatibility with computer system designs that are not able to support the single clock bus transfer protocol of the invention (for example, due to the L2 cache being unable to meet the ADS#-to-L2_HIT timing specification).

For the exemplary computer system, single clock bus transfers are enabled at reset. Specifically, at reset, the chipset logic asserts the SCBT configuration signal, placing the microprocessor in an SCBT mode implementing the SCBT protocol.

The microprocessor will use the SCBT protocol to effect single clock bus transfers until another reset occurs. If at reset SCBT is not asserted, then the microprocessor will use the conventional bus protocol—L2_HIT is masked, and EFF_BRDY# and EFF_KEN# are generated respectively in response to BRDY# and KEN# in all cases.

2.2. SCBT Protocol

For the exemplary microprocessor, the SCBT protocol is implemented by logic in the BIU (see FIG. 1a). In particular, the BIU receives as a control signal L2_HIT from the L2 cache (see FIG. 3a), and includes logic to generate the internal EFF_BRDY# and EFF_KEN# signals (see FIG. 3b).

For the exemplary SCBT protocol, in addition to EFF_BRDY#, and EFF_KEN#, the SCBT control signals (internal to the microprocessor) are: CACHE_REQ and LAST_BRDY#.

CACHE_REQ is generated by cache control logic when an access misses in the internal cache. CACHE_REQ is asserted prior to or during all microprocessor-initiated bus transactions.

LAST_BRDY# is generated by the BIU to indicate that the current EFF_BRDY# (either in response to L2_HIT or BRDY#) marks the end of a bus cycle (burst or non-burst). Thus, LAST_BRDY# will be asserted contemporaneously with the first EFF_BRDY# in a non-burst bus cycle, while for burst-mode bus cycles LAST_BRDY# will not be asserted until the fourth EFF_BRDY#.

For the exemplary SCBT protocol, if the current bus cycle is a read cycle (as determined by W/R#), and if the microprocessor asserts CACHE# (indicating that the read is potentially cacheable), the BIU uses L2_HIT to generate EFF_KEN#. When EFF_KEN# is sampled active with EFF_BRDY# (or NA#), the BIU converts the potentially cacheable read to a burst fill cycle.

That is, the conventional 586 bus protocol calls for KEN# to be returned in the same clock as the first BRDY# or NA#. It is assumed that the exemplary system logic will not be able to return KEN# with sufficient timing margin to enable the transfer to be detected as the first of a burst transfer.

Thus, when L2_HIT is asserted, EFF_KEN# is generated, causing the BIU to treat the current bus transfer as the first transfer of a burst fill cycle. LAST_BRDY# will not be asserted for the current bus operation, but rather, will be asserted along with the fourth EFF_BRDY#.

When a bus cycle (burst or non-burst) completes (LAST_BRDY# asserted), the microprocessor is ready to initiate another bus cycle in the next clock. However, depending on computer system design, SCBT operations may cause a potentially adverse bus condition when a read cycle is followed immediately in the next clock (as it could be according to the SCBT protocol) by a write cycle or a write cycle is followed immediately by a read cycle. Under these circumstances, one device's bus drivers may still be turning off while another device's bus drivers are turning on, producing a temporary bus conflict between the microprocessor and either the cache memory 84 or DRAM 86.

The exemplary SCBT protocol uses a FORCE_DEADCLK signal to avoid this potential bus conflict. Specifically, if enabled, FORCE_DEADCLK will be asserted after the completion of the current bus cycle if a CACHE_REQ for another bus cycle is pending and W/R# for the pending bus cycle request is different than W/R# for the current bus cycle. With FORCE_DEADCLK asserted, the pending bus cycle is not started during the clock period immediately following the completion of the current bus cycle even though the SCBT protocol would support such an operation.

The FORCE_DEADCLK mechanism is not required if the pending bus cycle is run as a pipeline bus cycle, as that situation is handled by the conventional 586 bus protocol. Specifically, an analogous situation arises if, during a current bus cycle, (a) CACHE_REQ is asserted for a pending bus cycle, (b) the system logic asserts NA# such that ADS# for the pending bus cycle is driven out, and (c) W/R# for the current and pending bus cycles is different. In this case, the microprocessor will delay for one clock after BRDY# for the current bus cycle before recognizing BRDY# for the pipeline bus cycle.

Figure 4:
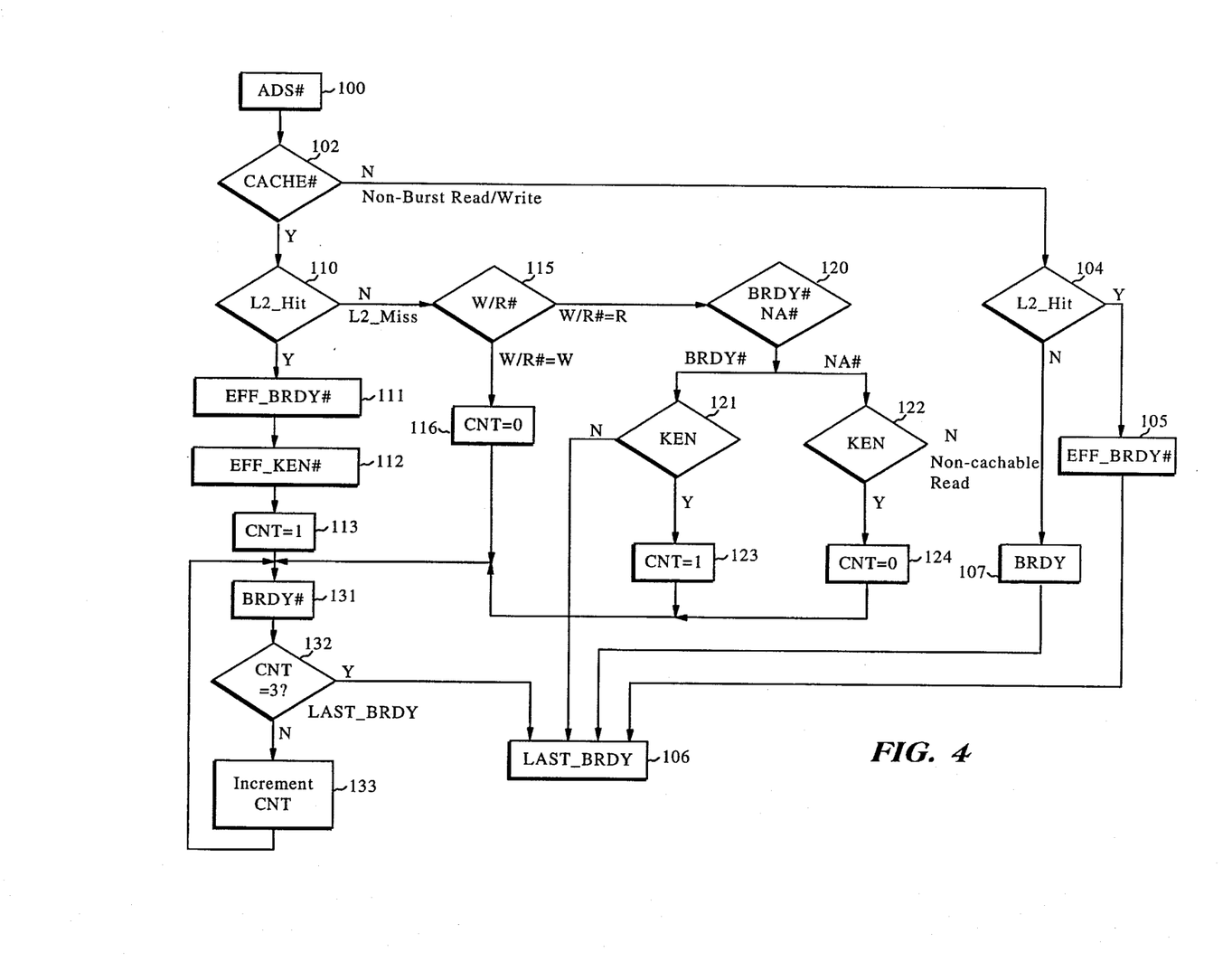
FIG. 4 illustrates the exemplary SCBT protocol.

FIG. 4 is illustrates the SCBT protocol. A bus cycle is initiated (100) with the BIU driving out an address strobe ADS# with an address and associated bus cycle control signals, including CACHE# and W/R#.

If CACHE# is not asserted (102), then the bus cycle is a non-cacheable read/write (depending on W/R#). If L2_HIT is asserted (104), then in accordance with the SCBT protocol, EFF_BRDY# (105) is generated (EFF_KEN# is ignored), along with LAST_BRDY# (106), to complete the bus cycle in the same clock as ADS#. If L2_HIT is not asserted (104), then the non-cacheable read/write cycle will be serviced by the system DRAM, and the BIU waits for BRDY# (107) from the system logic to complete the bus cycle.

If CACHE# is asserted (102), then the bus cycle is either a potentially cacheable read/fill (W/R# =R), or a replacement/snoop write-back (W/R#=W).

If L2_HIT is asserted (110), then in accordance with the SCBT protocol, EFF_BRDY# (111) and EFF_KEN# (112) are generated (LAST_BRDY# is not generated) and the internal BRDY# count is set to [1] (113). For reads (W/R# =P0, EFF_KEN# is detected internally as indicating a burst fill cycle (KEN# is ignored) in which the first transfer will complete in the same clock as ADS#.

If L2_HIT is not asserted (110), indicating an L2 miss, then in accordance with the exemplary SCBT protocol, a single clock bus transfer will not occur. Rather, the bus cycle will be serviced by the system DRAM, and the BIU waits for bus cycle control signals from the system logic. Specifically, depending on W/R# (112), the BIU samples BRDY# (and NA#) and, for reads, KEN#, and EFF_BRDY# and EFF_KEN# will be generated from BRDY# (or NA#) and KEN#.

For replacement and snoop write-back cycles (W/R#=W), the internal BRDY# count is set to [0] (116). According to the conventional 586 bus protocol, the BIU then samples BRDY#s to indicate the completion of each transfer of the burst write cycle.

For potentially cacheable read cycles (W/R#=R), according to the conventional 586 bus protocol, the BIU samples (120) both BRDY# and NA#. NA# can be asserted by the system logic during non-cacheable reads/writes and potentially cacheable reads. The BIU will convert the potentially cacheable read to a burst fill i.e. KEN# is returned either (a) in the same clock as the first BRDY#, or (b) in the same clock as NA#.

If KEN is sampled asserted either with BRDY# (121) or NA# (122), then the BIU converts the bus cycle to a burst fill. The internal BRDY# count is set to [1] (123) if BRDY# has been asserted, or to [0] (124) if BRDY# has not been asserted.

If KEN# is not asserted, then the read is non-cacheable, and LAST_BRDY# is generated (106) when BRDY# is sampled active, completing the bus cycle.

For all burst transfers—fills and replacements/snoop write-backs—the BIU counts (131/132) BRDY#s, incrementing (133) the count until the fourth BRDY# is sampled active. With the fourth BRDY#, LAST_BRDY# is generated (106) to complete the bus cycle.

Figure 5:
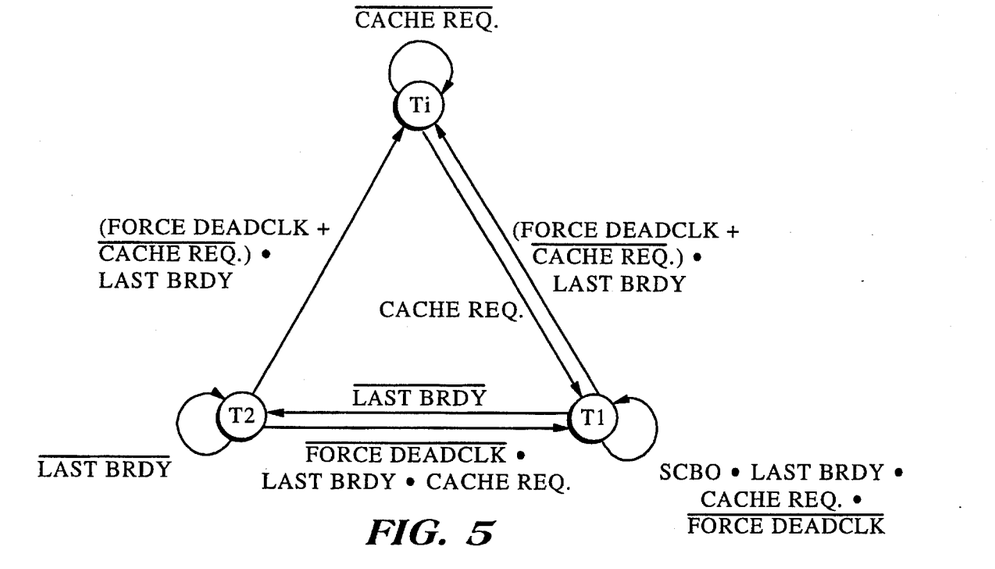
FIG. 5 is a state diagram illustrating the bus state transitions for the exemplary SCBT protocol.

FIG. 5 illustrates the bus state transitions for the exemplary SCBT protocol. This discussion assumes that SCBT mode has been enabled.

According to convention, a bus cycle (burst or non-burst) has two states designated T1 and T2. The first clock of a bus cycle (ADS# driven out) is designated as state T1, and all subsequent clocks required by the bus cycle are designated state T2 (i.e., until EFF_BRDY# is generated with LAST_BRDY# asserted).

Thus, in the state diagram, Ti represents the idle state for the bus, while T1 represents the first clock of a bus cycle (burst or non-burst, and T2 represents the second and subsequent clocks in the bus cycle burst or non-burst).

When in state Ti, asserting CACHE_REQ will transition the bus to state T1 (ready for the initiation of a bus cycle with an ADS# strobe) in the next clock (assuming FORCE_DEADCLK is not asserted).

When the bus is in state T1, the next state transition will depend on LAST_BRDY#.

If LAST_BRDY# is not asserted (indicating a multiple-clock bus cycle), the next state will be T2 which constitutes the second and subsequent clock periods of a multiple-clock bus cycle. The multiple clock bus cycle may be either a non-burst bus cycle that cannot be completed in a single clock (i.e., during state T1), or a burst cycle.

If LAST_BRDY# is asserted, then the state transition depends on CACHE_REQ and FORCE_DEADCLK If CACHE_REQ is asserted, and FORCE_DEADCLK is not asserted, then the next state will be T1 again (initiating the next bus cycle). If either FORCE_DEADCLK is asserted or CACHE REQUEST is not asserted, then the microprocessor will return to the idle state Ti from state T1.

When the bus is in state T2, representing the second and subsequent clock periods in a multiple-clock bus transaction, the next state will always be T2 until LAST_BRDY# is generated to indicate that the cycle has been completed. Once LAST BRDY is asserted, then the state transition depends on CACHE_REQ and FORCE_DEADCLK: (a) if CACHE_REQ is asserted, and FORCE_DEADCLK is not asserted, then the bus will transition to state T1, while (b) if either FORCE_DEADCLK is asserted or CACHE_REQ is not asserted, then the bus will rerun to the idle state Ti.

Figure 6A:
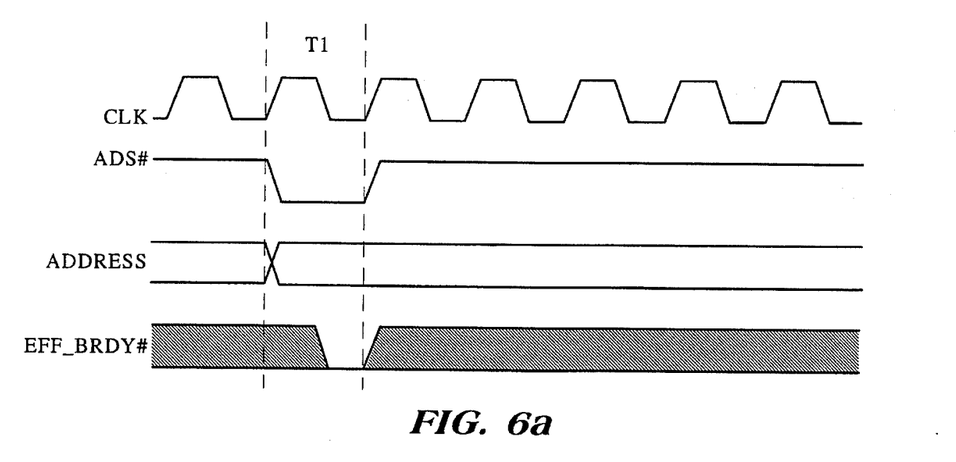
FIGS. 6a and 6b are timing diagrams illustrating single cycle bus transfers (non-burst and burst) implemented in accordance with the exemplary SCBT protocol.
Figure 6B:
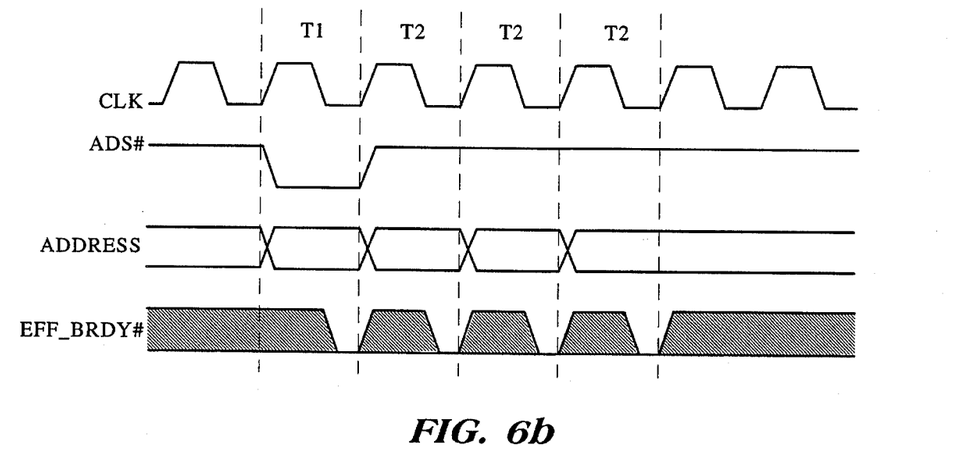

FIGS. 6a and 6b illustrate the bus timing for the exemplary SCBT protocol respectively for non-burst and burst cycles. Referring to FIG. 5a, for non-burst bus cycles, EFF_BRDY# is sampled active by the microprocessor in state T1, the same clock cycle as the ADS# strobe, completing the bus cycle in a single clock. Similarly, referring to FIG. 5b, for burst cycles, EFF_BRDY# and, for reads, EFF_KEN# are sampled in the same clock cycle as ADS#, so that the first transfer of the burst is completed in a single clock (allowing the burst cycle to complete in four clock cycles).

Figure 7:
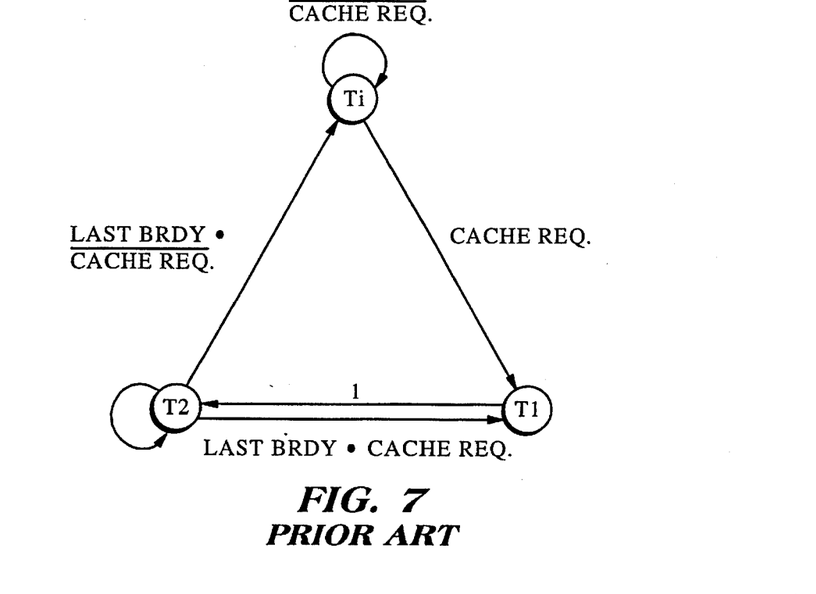
FIG. 7 is a state diagram illustrating the bus state transitions for the exemplary microprocessor when the SCBT protocol is not enabled.

For comparison, FIG. 7 illustrates a bus state diagram if SCBT mode is not enabled. In this case, FORCE_DEADCLK is not enabled because the T1 state is only used by the microprocessor to drive ADS# and address—no other device's bus drivers will be attempting to drive the data bus in the same dock as ADS#. From the Background, the conventional 586 bus protocol handles situations in which a pipelined read/write cycle is initiated during a current write/read cycle—a current cycle T2P state (not shown) will transition for one clock to a T2D state (not shown) before transitioning to T2 for the pipeline cycle data transfer.

From the idle state Ti, if CACHE_REQ is asserted, the bus will transition to state T1, and a bus cycle will be initiated with ADS#. From state T1, the next state will always be T2 (i.e., data will not be driven in T1). Once the bus is in state T2, the next state will continue to be T2 until LAST_BRDY# is asserted—when LAST_BRDY# is asserted, the next state depends on CACHE_REQ. If CACHE_REQ is asserted, the bus will transition to T1. If CACHE_REQ is not asserted, the bus will transition to the idle state Ti.

3. Conclusion

Although the Detailed Description of the invention has been directed to certain exemplary embodiments, various modifications of these embodiments, as well as alternative embodiments, will be suggested to those skilled in the art.

For example, describing the SCBT protocol in terms of the conventional 586 bus architecture and signaling protocol is exemplary only—the invention has general application to a protocol for performing bus transfers in a single clock cycle. Moreover, as DRAM technology improves, DRAM access times may approach current SRAM access times, eliminating the need for L2 cache, and enabling an equivalent implementation of the single cycle bus transfer protocol in a microprocessor-DRAM combination.

Also, references to dividing data into bytes, words, double words (dwords), quad words (qwords), etc., when used in the claims, are not intended to be limiting as to the size, but rather, are intended to serve as generic terms for blocks of data.

Moreover, various modifications based on trade-offs between hardware and software logic will be apparent to those skilled in the art.

The invention encompasses any modifications or alternative embodiments that fall within the scope of the Claims.

We claim:

1. A computer system implementing a single clock bus transfer protocol, the computer system including a processor, system logic, and an external memory subsystem, which are intercoupled by a bus architecture using a bus protocol in which the processor initiates a bus transfer between the processor and the memory subsystem by outputting an ADDRESS, and the system logic signals that the bus transfer is complete by returning a READY signal, comprising:

(a) a bus interface unit (BIU) in the processor that interfaces to the bus architecture and implements the bus protocol including a single clock bus transfer (SCBT) protocol;

(b) in response to the BIU initiating a bus transfer in a first clock cycle by outputting an ADDRESS, the memory subsystem generates a transfer ready signal to indicate that the memory subsystem is ready to complete the transfer, the transfer ready signal being provided to both the system logic and the processor, thereby enabling the system logic to signal READY to the processor in a subsequent clock cycle;

(c) for at least some bus transfers, the memory subsystem generates the transfer ready signal in the first clock cycle of such bus transfer;

(d) SCBT logic that generates an effective READY signal in response to either (i) READY from the system logic, or (ii) the transfer ready signal from the memory subsystem;

(e) in response to the generation of the effective READY, the BIU completes the bus transfer;

(f) such that, for bus transfers in which the memory subsystem generates the transfer ready signal in the first clock cycle of the bus transfer, the SCBT logic generates the effective READY in such first clock cycle, thereby enabling the BIU to complete the bus transfer in the first clock cycle.

2. The computer system of claim 1, (a) wherein the memory subsystem includes system memory and an L2 cache, the L2 cache being responsive to an ADDRESS hit to generate an L2 HIT signal, and (b) wherein the L2 HIT signal is the transfer in ready signal provided to the system, logic and the processor.

3. The computer system of claim 2, (a) wherein the bus protocol includes the burst transfer of a sequence of bus transfers;

(b) wherein for selected bus transfers initiated by the processor, the system logic returns a burst transfer signal substantially simultaneously with the READY, indicating to the BIU that the bus transfer is the first of a burst transfer;

(c) the SCBT logic generates an effective burst transfer signal in response to either (i) the burst transfer signal from the system logic, or (ii) the L2 HIT signal; and (d) wherein, in response to the effective burst transfer signal, the BIU detects the bus transfer as the first of a burst transfer.

4. The computer system of claim 1, wherein, for a current bus transfer that is completed in the first block cycle of such bus transfer, the BIU initiates a next bus transfer in a next clock cycle.

5. The computer system of claim 4, wherein the SCBT logic inhibits the BIU from initiating the next bus transfer in the next clock cycle if the next bus transfer would result in a read and a write bus transfer occurring in consecutive clock cycles.

6. The computer system of claim 1, wherein (a) the processor is an x86 microprocessor, and (b) the bus architecture is an x86 bus architecture in which the bus protocol for a bus transfer includes initiating.

7. A processor implementing a single clock bus transfer protocol in a computer system that includes the processor, system logic, and an external memory subsystem, which are intercoupled by a bus architecture using a bus protocol in which the processor initiates a bus transfer between the processor and the memory subsystem by outputting an ADDRESS, and the system logic signals that the bus transfer is complete by returning a READY signal, comprising:

(a) bus interface means in the processor for interfacing to the bus architecture and implementing the bus protocol including a single clock bus transfer (SCBT) protocol;

(b) in response to the bus interface means initiating a bus transfer in a first clock cycle by outputting an ADDRESS, the memory subsystem generates a transfer ready signal to indicate that the memory subsystem is ready to complete the transfer, the transfer ready signal being provided to both the system logic and the processor, thereby enabling the system logic to signal READY to the processor in a subsequent clock cycle;

(c) for at least some bus transfers, the memory subsystem generates the transfer ready signal in the first clock cycle of such bus transfer;

(d) SCBT means for generating an effective READY signal in response to either (i) READY from the system logic, or (ii) the transfer ready signal from the memory subsystem;

(e) in response to the generation of the effective READY, the bus interface means completes the bus transfer; (f) such that, for bus transfers in which the memory subsystem generates the transfer ready signal in the first clock cycle of the bus transfer, the SCBT means generates the effective READY in such first clock cycle, thereby enabling the bus interface means to complete the bus transfer in the first clock cycle.

8. The processor of claim 7, (a) wherein the memory subsystem includes system memory and an L2 cache, the L2 cache being responsive to an ADDRESS hit to generate an L2 HIT signal, and (b) wherein the L2 HIT signal is the transfer ready signal provided to the system logic and the processor.

9. The process of claim 8, (a) wherein the bus protocol includes the burst transfer of a sequence of bus transfers;

(b) wherein for selected bus transfers initiated by the processor, the system logic returns a burst transfer signal substantially simultaneously with the READY, indicating to the bus interface means that the bus transfer is the first of a burst transfer;

(c) the SCBT means generates an effective burst transfer signal in response to either (i) the burst transfer signal from the system logic, or (ii) the L2 HIT signal; and (d) wherein, in response to the effective burst transfer signal, the bus interface means detects the bus transfer as the first of a burst transfer.

10. The processor of claim 7, wherein, for a current bus transfer that is completed in the first clock cycle of such bus transfer, the bus interface means initiates a next bus transfer in a next clock cycle.

11. The processor of claim 10, wherein the SCBT means inhibits the bus interface means from initiating the next bus transfer in the next clock cycle if the next bus transfer would result in a read and a write bus transfer occurring in consecutive clock cycles.

12. The processor of claim 7, wherein (a) the processor is an x86 microprocessor, and (b) the bus architecture is an x86 bus architecture in which the bus protocol for a bus transfer includes initiating the bus transfer with an address strobe ADS# and an ADDRESS.

13. A single clock bus transfer protocol method implemented in a computer system that includes a processor, system logic, and an external memory subsystem, which are intercoupled by a bus architecture using a bus protocol in which the processor initiates a bus transfer between the processor and the memory subsystem by outputting an ADDRESS, and the system logic signals that the bus transfer is complete by returning a READY signal, comprising the steps:

(a) in response to the initiation of a bus transfer in a first clock cycle by outputting an ADDRESS, generating in the memory subsystem a transfer ready signal to indicate that the memory subsystem is ready to complete the bus transfer;

(b) providing the transfer ready signal to both the system logic and the processor, thereby enabling the system logic to signal READY to the processor in a subsequent clock cycle;

(c) for at least some bus transfers, generating the transfer ready signal in the first clock cycle of such bus transfer;

(d) generating an effective READY in response to either (i) READY from the system logic, or (ii) the transfer ready signal from the memory subsystem; and (e) in response to the generation of the effective READY, completing the bus transfer;

(f) such that, for bus transfers in which the memory subsystem generates the transfer ready signal in the first clock cycle of the bus transfer, the effective READY is generated in such first clock cycle, thereby enabling the bus interface means to complete the bus transfer in the first clock cycle.

14. The method of claim 13, wherein (a) the memory subsystem includes system memory and an L2 cache, and (b) wherein the step of generating a transfer ready signal is accomplished by generating in the L2 cache an L2 HIT signal in response to an ADDRESS hit, and providing the L2 HIT signal to the system logic and the processor as the transfer ready signal.

15. The method of claim 14, wherein the bus protocol includes the burst transfer of a sequence of bus transfers, and wherein for selected bus transfers initiated by the processor, the system logic returns a burst transfer signal substantially simultaneously with the READY, indicating that the bus transfer is the first of a burst transfer, further comprising the steps:

(a) generating an effective burst transfer signal in response to either (i) the burst transfer signal from the system logic; or (ii) the L2 HIT signal; and (b) in response to the effective burst transfer signal, detecting the bus transfer as the first of a burst transfer.

16. The method of claim 13, further comprising the steps of:

(a) completing a current bus transfer in the first clock cycle of such bus transfer; and (b) initiating a next bus transfer in a next clock cycle.

17. The method of claim 16, further comprising the step:

(a) inhibiting the initiation of the next bus transfer in the next clock cycle if the next bus transfer would result in a read and a write bus transfer occurring in consecutive clock cycles.

18. The method of claim 13, wherein (a) the processor is an x86 microprocessor, and (b) the bus architecture is an x86 bus architecture in which the bus protocol for a bus transfer includes initiating the bus transfer with an address strobe ADS# and an ADDRESS.

* * * * *